Sept. 8, 1959                R. D. PIKE                2,903,341
        PROCESS OF TREATING FERROTITANIFEROUS MATERIALS
                    Filed Dec. 24, 1956
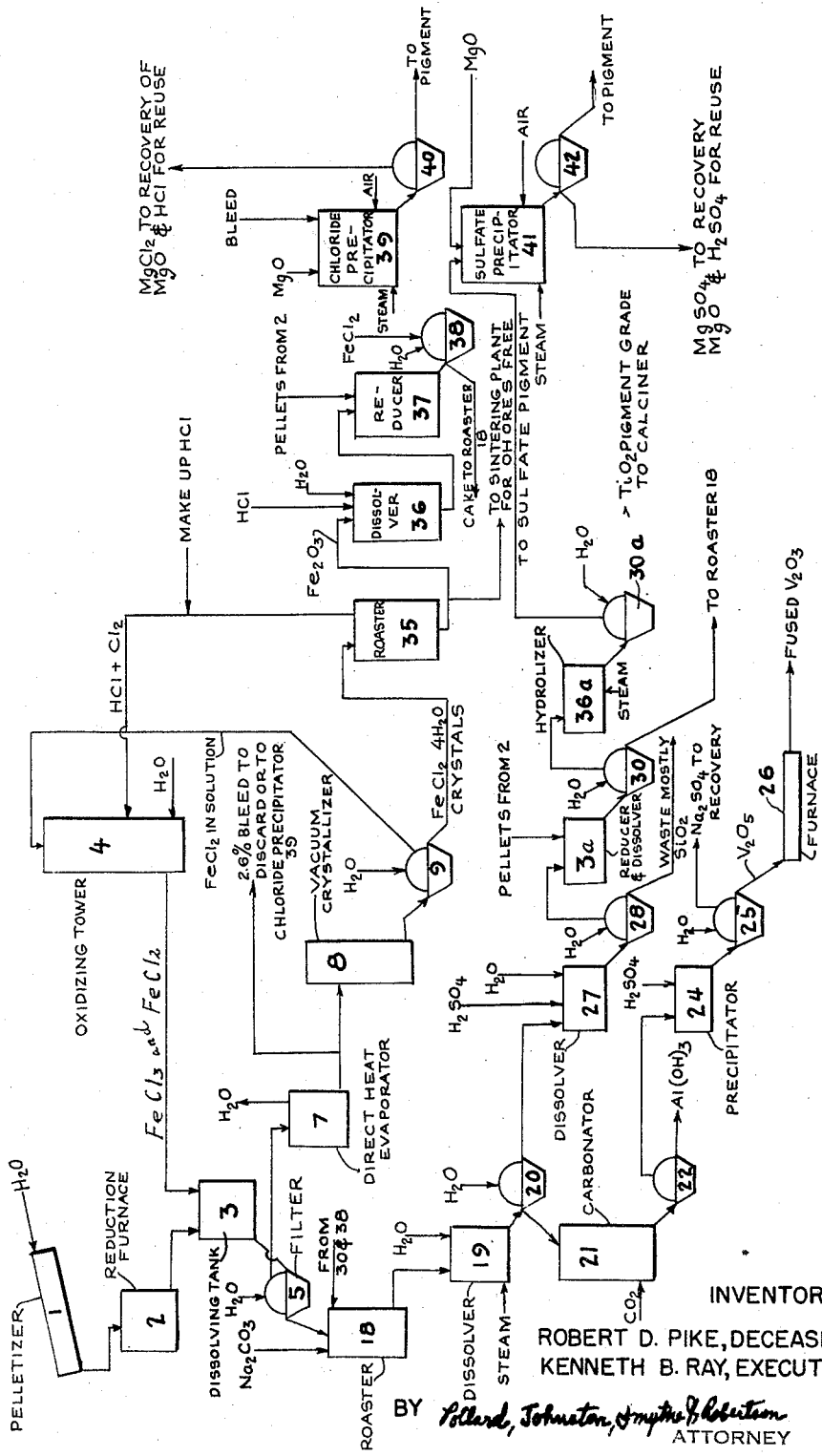
INVENTOR
ROBERT D. PIKE, DECEASED,
KENNETH B. RAY, EXECUTOR
BY
                                        ATTORNEY 2,903,341
Patented Sept. 8, 1959

2,903,341

PROCESS OF TREATING FERROTITANIFEROUS MATERIALS

Robert D. Pike, deceased, late of Greenwich, Conn., by Kenneth B. Ray, Greenwich, Conn., and The Stamford Trust Co. of Connecticut, executors Application December 24, 1956, Serial No. 630,418

1 Claim. (Cl. 23—202)

This invention relates to the treatment of ferrotitaniferous material to remove iron. More particularly, it relates to the recovery of iron, titanium, and other values from such materials.

It is well known that iron and titanium appear in nature in intimate association with one another in the form of various types of ores. For example, large deposits of titaniferous magnetite can be found in the United States and Canada. Also ilmenite, a ferrotitaniferous material, is found widely distributed throughout the world. Titaniferous slags, which are ferrotitaniferous materials, are becoming increasingly available. However, the very intimacy of this association and the inherent characteristic of certain ferrotitaniferous materials has made the economical extraction of mineral values from them a difficult and, from a practical viewpoint, a largely unsolved problem.

It is a principal object of this invention to separate iron from ferrotitaniferous material in an economical manner so that a valuable titanium oxide concentrate is obtained.

It is a special object of this invention to recover metal from ferrotitaniferous materials in such a purified state that their value is materially enhanced.

It is another special object of this invention to produce a titanium oxide concentrate by leaching iron from a ferrotitaniferous material in an efficient and economical cycle process.

It is yet a still further special object of this invention to separate iron from a titaniferous magnetite in such a manner that both iron and titanium values may be economically recovered therefrom.

Other objects and features of this invention will become apparent from the more detailed description which follows.

The manner of accomplishing the foregoing and other objectives of the invention will become apparent from a description of the process in connection with the attached diagrammatic flow sheet illustrating a process for treating titaniferous magnetite.

A typical titaniferous magnetite deposit, known as Iron Mountain ores, can be found in Albany County, Wyoming. The average analysis of this ore is as follows:

| Constituent | Percent in Concentrates | Recovery, Percent |
|---|---|---|
| Fe | 50.9 | 86.2 |
| TiO₂ | 19.6 | 89.6 |
| SiO₂ | 3.6 | 31.6 |

In accordance with known practices, this ore is ground and pretreated, or beneficiated, to get rid of gangue and to separate magnetic and non-magnetic fractions by magnetic and electrostic separation. A typical magnetic concentrate has an average analysis as follows:

| | |
|---|---|
| Fe | 50.30 |
| TiO₂ | 19.77 |
| Al₂O₃ | 5.00 |
| CaO | .32 |
| MgO | 2.65 |
| SiO₂ | 2.84 |
| V₂O₅ | .59 |

This concentrate constitutes the plant heads used for illustrative purposes.

Referring to the diagrammatic flow sheet, concentrates are pelletized with water in tumbling pelletizer 1. Organic binders, such as lignin liquor, may be used. This will make the pellets firmer. Pellets are preferably subjected to gaseous reduction in furnace 2. Suitable and preferred processes are disclosed in Pike United States Patents 2,501,189 and 2,653,088. However, other satisfactory thermal methods for reducing the iron oxide to iron are known, such as by smelting, or other methods disclosed in Ravnestad et al., United States Patent 2,339,808.

In this way, 90% of the iron oxide can be reduced to the metallic iron with no appreciable effect on the other oxides present. The reduced pellets may be ground first, or introduced directly into dissolving and leaching tank 3, where the metallic iron reduces the ferric chloride content of the circulating plant liquor to ferrous chloride and the metallic iron is converted to soluble ferrous chloride and leached from the raw material. The residue from the dissolving and leaching tank 3 goes to the roaster 18, where it is treated as described subsequently.

The effluent from filter 5, which is a solution of ferrous chloride, constitutes the main plant circulation. It is first concentrated in direct heat evaporator 7, to eliminate water added to the main circulation, and is then cooled in vacuum crystallizer 8 to produce crystals of FeCl₂·4H₂O. The crystals are separated from the FeCl₂ solution at filter 9. These crystals represent the net production of Fe in the main process less that bled and by-passed to the iron pigment plant. They are roasted in 35, producing Fe₂O₃ and a gas containing HCl and Cl₂. Make-up HCl is supplied to this gas from a salt cake furnace, not shown, and the entire stream of gas with air for oxidation, enters the oxidizing tower 4, where the FeCl₃ is restored for application in dissolving tank 3.

The Fe₂O₃ produced in roaster 35, may be sintered or agglomerated in any suitable manner, producing a sulphur free furnace ore, for which there should be a good demand, especially in the west of the United States. The balance is redissolved in HCl or H₂SO₄ in dissolver 36 for pigment manufacture. This gives either ferric chloride or ferric sulphate. These salts should be reduced to the ferrous state before prepicipation, and this step will be assumed to take place in reducer 37. The insolubles are separated at filter 38 and the FeCl₂ solution is flowed to the chloride precipitator 39. This reduction will consume reduced pellets from 2, and will supply a further feed of residue to roaster 18.

The main circulation is bled at any convenient point, for example, between 7 and 8, for the purpose of keeping down the accumulation of magnesia in the solution. This bleed goes directly to the chloride precipitator 39 of the pigment plant.

So far as solublizing and leaching is concerned, a ferric-ferrous sulphate circulation, or a circulation of other mineral acid salts, could be employed, but such a circulation has no known advantages, and may have disadvantages. For example, when using the chloride cycle, the iron oxide reduced will be free of sulphur, and this may be of importance in marketing it as an agglomerated or sintered ore, or as a source for making hydrogen reduced powdered iron for use in metallurgy.

The undissolved residue remaining after leaching and dissolving metallic iron as ferrous chloride is a concentrate of $TiO_2$ and $V_2O_5$ derived from the plant heads which also contains most of the $Al_2O_3$. Also, as stated, while 90% of the iron oxide may be converted readily to iron, there still remains a small percentage of iron oxide which is not reduced and is separated with the other insoluble materials.

The residue from tank 3 and filter 5 is reacted with an excess of soda ash under oxidizing conditions in roaster 18 in order to obtain sodium aluminate and sodium orthovanadate, both of which are soluble in hot water. Some sodium metatitanate will be formed. This sodium metatitanate will remain in the cake from filter 20 as a concentrate of $TiO_2$ since it is not soluble in water. The soluble sodium aluminate and sodium orthovanadate are dissolved in the hot water of dissolver 19, and, after being separated from insolubles in filter chamber 20, flowed to the carbonater 21. In carbonater 21, the sodium aluminate is converted to aluminate hydroxide and is precipitated. Insoluble alumina hydroxide is separated from the soluble materials on filter 22 and is calcined, thereby producing a pure alumina. The remaining solution of sodium orthovanadate is treated with $H_2SO_4$ in precipitator 24, thereby producing a precipitate of $V_2O_5$, which is removed and washed in filter 25. This is known as red cake. It is fused in furnace 26, producing 90% fused $V_2O_5$. The solution of $Na_2SO_4$ may be discarded, or salt cake may be recovered from it.

The cake from filter 20, which is mostly $TiO_2$ and $Fe_2O_3$, with some $SiO_2$, is dissolved with sulphuric acid in 27. This is a step in the regular sulphate process for producing $TiO_2$ of pigment grade. In this case, the iron will occur as ferric sulphate in the dissolver 27, because the residue has been fully oxidized in the roaster 18. Insolubles are separated in filter 28. The ferric sulfate is reduced in 3a by dissolving the iron from reduced pellets received from reduction furnace 2. The reaction here is the same as in 3, except that a sulfate is involved. After filtering out the residue of the pellets in filter 30, which goes to roaster 18, along with the solids from 3, the solution is hydrolyzed in 36a, producing a titanium precipitate, which when calcined, or given other appropriate treatment, makes a $TiO_2$ pigment of rutile type. The titanium precipitated is filtered off in filter 30a. The liquid remaining is a solution of ferrous sulphate which joins the ferrous sulphate in that part of the pigment plant devoted to making ferrous hydroxide from ferrous sulphate, namely, the sulphate precipitator 41.

In this way, the vanadium and titanium are recovered from the leach residue, and the ferrous sulphate produced in this process goes directly to the iron pigment plant. Some reduced pellets are used for reduction in this process, and the insoluble residue from this step joins the like residue from filter 5, and both are roasted with soda ash in roaster 18.

Thus, the process is devised to be carried out in a flexible manner, depending to a considerable extent upon the respective demand for the several products, so that the mineral values are recovered in a very valuable form. For instance, the process may be visualized in terms of a main circulation and several branch-circulations. The main circulation comprises units 1, 2, 3, 4, 7, 8, 9 and 35. This main circulation is concerned primarily with producing pure and sulphur free $Fe_2O_3$ from the concentrates.

A first branch circulation comprises units 5, 18, 19, 20, 21, 22, 24, 25 and 26. This circulation is concerned with making $Al_2O_3$ and $V_2O_5$.

A second branch circulation comprises units 5, 18, 19, 27, 28, 3a, 30, 30a and 36a. This branch circulation is concerned with making pigment grade $TiO_2$.

A third branch circulation is a process not shown, which is for the purpose of producing sulphur free open hearth sinter, or agglomeration, from the output of roaster 35.

A fourth branch circulation comprises units 36, 37, 38 and 39, and is the chloride branch of the iron pigment plant.

A fifth branch circulation, comprising units 36, 37, 38 and 41, is the sulphate branch of the iron pigment plant.

As shown above, both fourth and fifth branch circulations consume pellets from 2 for reduction, thus adding indirectly to the amount of ore used.

Thus the process of the main circulation may be considered a cyclic process for separating iron from ferrotitaniferous material so as to obtain a valuable titanium oxide concentrate. As disclosed in the illustrative embodiment, the oxidic iron is reduced to metallic iron by a gaseous reduction. Then the iron is leached from the resulting ferrotitaniferous material in the form of ferrous chloride by treating the ferrotitaniferous material with a recycling aqueous solution of ferric chloride and ferrous chloride. Thereafter the insolubles including the titanium oxide concentrate is separated from the leach solution. The iron leached from the ferrotitaniferous material is recovered from the leach solution as crystals of ferrous chloride and residual ferrous chloride is converted to ferric chloride so as to form a new leaching solution. The new leaching solution is then recycled to produce further titanium oxide concentrate by leaching iron from ferrotitaniferous material by the reducing effect of iron upon its ferric chloride and the resulting formation of water soluble ferrous chloride.

The branch circulations serve the function, as stated, of recovering other mineral values advantageously in a highly purified form.

It will be understood that the foregoing details have been given for illustrative purposes only. Many variations and changes may be made in the specific reactants and in the specific reaction conditions of the process without departing from the substance or the spirit of the invention as herein disclosed and as defined in the appended claim.

What is claimed is:

A process for recovering mineral values from an oxidic ferrotitaniferous material containing vanadium pentoxide, which comprises thermally reducing a major part but not all of the oxidic iron to metallic iron thereby forming a ferrotitaniferous material containing metallic iron, iron oxide, titanium dioxide and vanadium pentoxide, leaching metallic iron from said material with a recycling aqueous leaching solution of a ferriferrous salt of a mineral acid thereby converting iron into water soluble ferrous salt of said acid and forming an aqueous leach solution, separating insoluble material from said leach solution including iron oxide, titanium dioxide and vanadium pentoxide, converting the water insoluble pentoxide into a water soluble vanadate, separating an aqueous solution of the water soluble vanadate from the residual water insoluble materials and recovering vanadium values from said aqueous solution, converting insoluble iron oxide and insoluble titanium dioxide of the residual material respectively into an aqueous solution of iron sulfate and titanic sulfate, hydrolizing the titanic sulfate to form insoluble titanic hydroxide, separating insoluble titanic hydroxide from the residual aqueous solution of iron sulfate and recovering titanium values from the titanic hydroxide, recovering iron values from the residual aqueous solution of iron sulfate, separating ferrous salt of said mineral acid from said leach solution, recovering iron values from said separated ferrous salt, converting residual ferrous salt of said acid in said leach solution to said ferric salt thereby forming a ferriferrous salt leaching solution, and recycling said leaching solution to leach further iron from ferrotitaniferous material.

References Cited in the file of this patent

UNITED STATES PATENTS

| | | |
|---|---|---|
| 1,014,793 | Weintraub | Jan. 16, 1912 |
| 1,938,461 | Prutton | Dec. 5, 1933 |
| 2,592,580 | Loevenstein | Apr. 15, 1952 |
| 2,771,341 | Barth | Nov. 20, 1956 |
| 2,773,743 | Fackert | Dec. 11, 1956 |

OTHER REFERENCES

Barksdale: "Titanium," The Ronald Press Co., New York, 1949, pages 126–127.

UNITED STATES PATENT OFFICE

CERTIFICATE OF CORRECTION

Patent No. 2,903,341 September 8, 1959

Robert D. Pike

It is hereby certified that error appears in the printed specification of the above numbered patent requiring correction and that the said Letters Patent should read as corrected below.

Column 1, line 35, after "metal" insert -- values --; line 40, for "cyclc" read -- cyclic --; column 2, line 58, for "prepicipation" read -- precipitation --.

Signed and sealed this 1st day of March 1960.

(SEAL)
Attest:

KARL H. AXLINE
Attesting Officer

ROBERT C. WATSON
Commissioner of Patents